United States Patent
Jactat et al.

(10) Patent No.: US 10,071,813 B2
(45) Date of Patent: Sep. 11, 2018

(54) HELICOPTER ENGINE AIR INTAKE WITH INCREASED BYPASS FLOW

(71) Applicant: SAFRAN HELICOPTER ENGINES, Bordes (FR)

(72) Inventors: Paul-Etienne Jactat, Pau (FR); Nicolas Bulot, Assat (FR); Pascal Lebrusq, Idron (FR); Thierry Vergez, Lee (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 467 days.

(21) Appl. No.: 14/417,225

(22) PCT Filed: Jul. 26, 2013

(86) PCT No.: PCT/FR2013/051809
§ 371 (c)(1),
(2) Date: Jan. 26, 2015

(87) PCT Pub. No.: WO2014/020267
PCT Pub. Date: Feb. 6, 2014

(65) Prior Publication Data
US 2015/0166194 A1 Jun. 18, 2015

(30) Foreign Application Priority Data

Jul. 30, 2012 (FR) .................................. 12 57385

(51) Int. Cl.
*B64D 33/02* (2006.01)
*F02C 7/055* (2006.01)

(52) U.S. Cl.
CPC .............. *B64D 33/02* (2013.01); *F02C 7/055* (2013.01); *B64D 2033/022* (2013.01);
(Continued)

(58) Field of Classification Search
CPC ........ F05D 2220/329; F02C 7/04; F02C 7/05; F02C 7/055; Y02T 50/672
(Continued)

(56) References Cited

U.S. PATENT DOCUMENTS 3,764,307 A * 10/1973 Sutar ....................... C22C 19/00
420/444
3,871,844 A * 3/1975 Calvin, Sr. ............. B01D 45/08
137/15.1
(Continued)

FOREIGN PATENT DOCUMENTS

EP  1 902 953   3/2008
FR  2 914 016   9/2008
(Continued)

OTHER PUBLICATIONS

International Search Report dated Oct. 7, 2013, in PCT/FR13/051809 filed Jul. 26, 2013.
(Continued)

*Primary Examiner* — Phutthiwat Wongwian
*Assistant Examiner* — Loren Edwards
(74) *Attorney, Agent, or Firm* — Oblon, McClelland, Maier & Neustadt, L.L.P.

(57) ABSTRACT

A helicopter engine air intake including an anti-icing grid that provides a large bypass flow in event of icing. The air intake includes air intake lips and an anti-icing grid mounted on outer ends of the air intake lips, being interposed in the air flow penetrating into the air intake, at least one air intake lip being formed by a thin metal sheet.

12 Claims, 2 Drawing Sheets

(52) U.S. Cl.
CPC ............... *B64D 2033/0233* (2013.01); *B64D 2033/0253* (2013.01); *F05D 2220/329* (2013.01); *Y02T 50/672* (2013.01)

(58) Field of Classification Search
USPC ...................................................... 60/39.093
See application file for complete search history.

(56) References Cited

U.S. PATENT DOCUMENTS

| | | | | |
|---|---|---|---|---|
| 4,006,999 | A | * | 2/1977 | Brantley ................ F01D 5/282 416/224 |
| 5,433,070 | A | * | 7/1995 | Amelio ..................... F02C 7/04 137/15.1 |
| 6,179,249 | B1 | | 1/2001 | Canadas |
| 7,938,618 | B2 | * | 5/2011 | Baude .................... B64C 27/14 415/119 |
| 2005/0023412 | A1 | | 2/2005 | Baptist et al. |
| 2008/0185217 | A1 | | 8/2008 | Baude |
| 2010/0101206 | A1 | | 4/2010 | Haehner et al. |
| 2011/0001003 | A1 | | 1/2011 | Krahl |
| 2011/0192134 | A1 | | 8/2011 | Vauchel et al. |

FOREIGN PATENT DOCUMENTS

| | | |
|---|---|---|
| GB | 1 474 390 | 5/1977 |
| JP | 2010-522296 A | 7/2010 |
| RU | 2 059 963 C1 | 5/1996 |
| RU | 2 348 570 C1 | 3/2009 |

OTHER PUBLICATIONS

Japanese Office Action dated May 9, 2017 in Patent Application No. 2015-524828 (with English Translation).
Russian Office Action dated Jun. 29, 2017 in Patent Application No. 2015106685 (without English Translation).
Combined Office Action and Search Report dated Apr. 12, 2017 in Chinese Patent Application No. 201380039984.8 (with English translation of Office Action and English translation of categories of cited documents).

\* cited by examiner

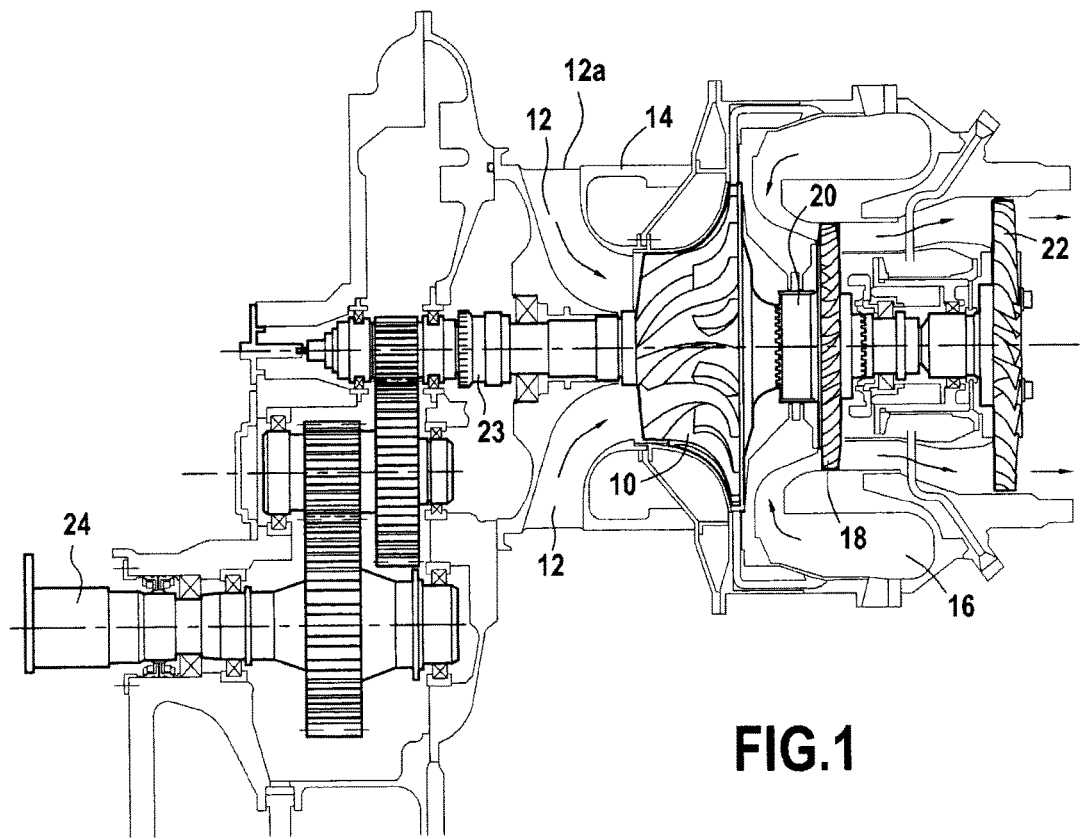
FIG.1
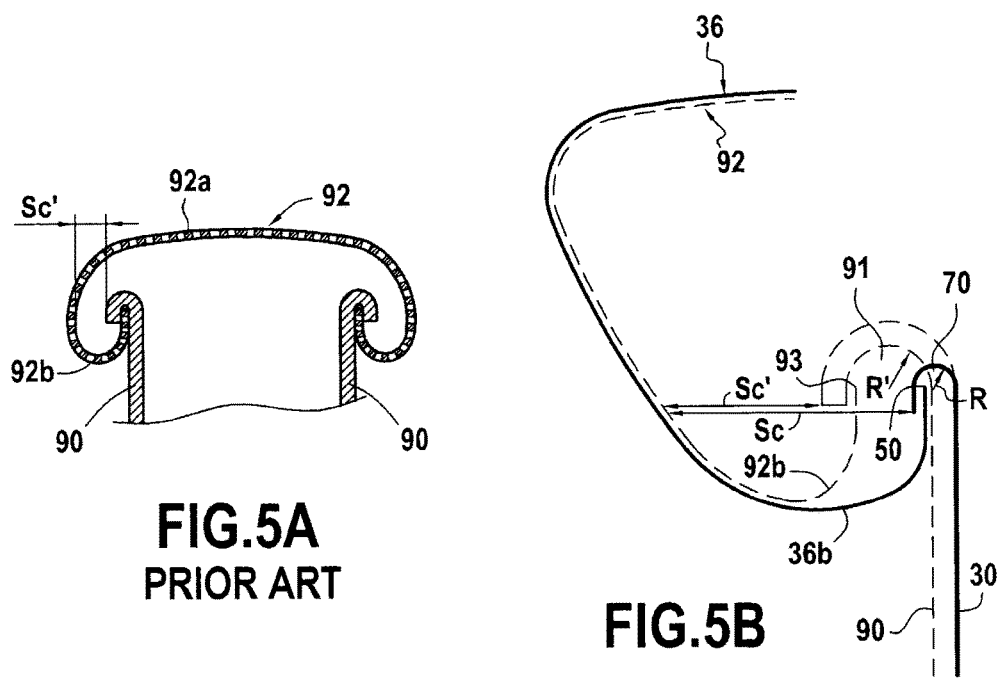
FIG.5A
PRIOR ART
FIG.5B

HELICOPTER ENGINE AIR INTAKE WITH INCREASED BYPASS FLOW

FIELD OF THE INVENTION

The present description relates to an air intake for a helicopter engine, the intake being provided with an anti-icing grid that offers a large amount of bypass flow in the event of icing.

STATE OF THE PRIOR ART

In order to protect against the risk of ice forming in the air intake and in the air feed passage of the engine while operating under icing conditions, present air intakes are provided with an anti-icing grid that completely covers the air intake opening into the engine. This applies in particular to the Turbomeca TM-333 engine, as shown in FIG. 5A. The grid ensures that the icing, if any, forms on the external surface 92a of the grid 92 rather than in the air intake itself or in the air feed passage. An internal portion 92b of the grid 92 is then provided in order to allow bypass air to flow around the external surface 92a of the grid 92 when it is iced.

Nevertheless, in present-day engines, the air intake lips 90 on which the anti-icing grid 92 is mounted are generally machined in solid material, as in the TM-333 engine, or else they are made of composite material, and are thus particularly bulky; given the lack of space around the air intake, it is then found that the bypass section Sc' that remains available when the external surface 92a of the grid 92 has iced is small, which limits the flow rate of air in the event of icing.

In addition, both the models that are machined in solid material and the models that are made out of composite material present difficulties of assembly. In particular, with composite material, the margins of the grid are adhesively bonded to a section member which is in turn adhesively bonded to the composite lips: in addition to the complexity of such assembly operations, it is at present difficult to use adhesive with composite materials.

There therefore exists a real need for a helicopter engine air intake that provides a considerable amount of bypass flow in the event of icing, and that avoids the drawbacks inherent to the above-described prior art air intakes.

SUMMARY OF THE INVENTION

The present description relates to an air intake for a gas turbine helicopter engine having a compressor and a passage for feeding the compressor with air, which passage opens out at its upstream end via said air intake, the air intake comprising air intake lips, and an anti-icing grid mounted on the outer ends of the air intake lips, being interposed in the air flow penetrating into the air intake, and in which at least one air intake lip is formed by a thin metal sheet.

By using a thin metal sheet for making said intake lip, an intake lip is made available that is of very small thickness, such that for a given available outside space, a large free volume is left available in which to provide a large bypass section within the anti-icing grid. Thus, in the event of the external surface of the grid icing, a portion of the grid remains available that is of sufficient size to enable a bypass flow in which the air flow rate is reduced only a little compared with normal operating conditions.

In particular, by using a thin metal sheet, which presents very good shaping or forming properties, it is possible to use shapes that are complex and compact, since such metal sheet can be used in particular with radii of curvature that are very small. Thus, assembling the grid on the air intake lip is made easier: in particular it becomes possible to have greater proximity between the grid and the lip, and thus greater compactness. The use of a thin metal sheet also makes it possible to use certain fastening techniques, such as welding, that are not possible with other materials.

Furthermore, the thin metal sheet provides the advantage of small weight, thereby enabling operating costs to be reduced by reducing the fuel consumption of the engine. In certain embodiments, said thin metal sheet forming said at least one air intake lip possesses thickness of less than 1.5 millimeters (mm), and preferably of less than 0.8 mm.

In certain embodiments, the outer end of said at least one air intake lip is curved outwardly into a U-shape and the margin of the anti-icing grid is engaged in the U-shaped space as defined in this way. Because of the forming properties of the metal sheet, it is possible to define a U-shaped space that is very narrow and well adapted to the dimensions of the margin of the grid. In addition, because of these forming properties, such a U-shaped space may be formed very close to the lip itself, thereby serving to release a large amount of transverse space that can contribute to increasing the bypass section.

In certain embodiments, the margin of the anti-icing grid fits closely to the walls of the U-shaped space defined by the intake lip. This makes it possible in particular to crimp the margin of the grid in this U-shaped space, or to assemble those parts together by stamping.

In certain embodiments, the margin of the anti-icing grid is provided with fastener tabs that are fastened to said at least one air intake lip. This assembly solution, which is made possible by the compactness and the proximity themselves made possible by the forming properties of the metal sheet, provides advantages in terms of simplicity and reliability. Such fastener tabs may be provided at optionally regular intervals all along the air intake lip.

In certain embodiments, the margin of the anti-icing grid is provided with a continuous fastener bead fastened to said at least one air intake lip. This assembly solution enables fastening to be provided all along a segment of the lip or all along the entire lip.

In certain embodiments, the margin of the anti-icing grid is fastened to said at least one air intake lip by welds. This fastening is reliable and durable.

In other embodiments, the margin of the anti-icing grid is fastened to said at least one air intake lip by brazing, by spots of adhesive, by crimping, or indeed by rivets.

In certain embodiments, the fastening of said anti-icing grid to said to least one air intake lip is devoid of adhesive bonding. The difficulties of using the adhesive technique are thus avoided.

In certain embodiments, the margin of the grid is a part that is separate from the body of the anti-icing grid, the margin of the grid being fastened to the body of the grid. This solution makes it easy to adapt a fastener interface that is specially designed for providing bonding and for being fastened to the air intake lip on an anti-icing grid, that is itself shaped solely for the purpose of avoiding icing and providing a large bypass section. In particular, the material of the margin may be different from the material of the body of the grid: for example, the margin may be made of plastics material while the body of the grid is made of metal.

In certain embodiments, the margin of the grid is fastened to the body of the anti-icing grid by brazing.

In certain embodiments, the air intake lip is made as a single piece over an angular sector of more than 90°, and preferably equal to 180°.

In certain embodiments, both air intake lips are made of thin metal sheets.

In certain embodiments, the air intake is of the radial type.

In other embodiments, the air intake is of the axial type.

The present invention also provides a gas turbine helicopter engine having an air intake in accordance with any of the above-described embodiments.

The above-mentioned characteristics and advantages, and others, appear on reading the following detailed description of embodiments of the proposed air intake. This detailed description is made with reference to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are referenced using the same reference signs.

FIG. 1 is a diagrammatic overall view of a helicopter engine.

FIG. 5A is a view of a prior art air intake.

FIG. 5B is a sketch showing diagrammatically the increase in bypass section made available by an air intake of the invention compared with an air intake of the prior art.

DETAILED DESCRIPTION OF AN EMBODIMENT

Figure 2:
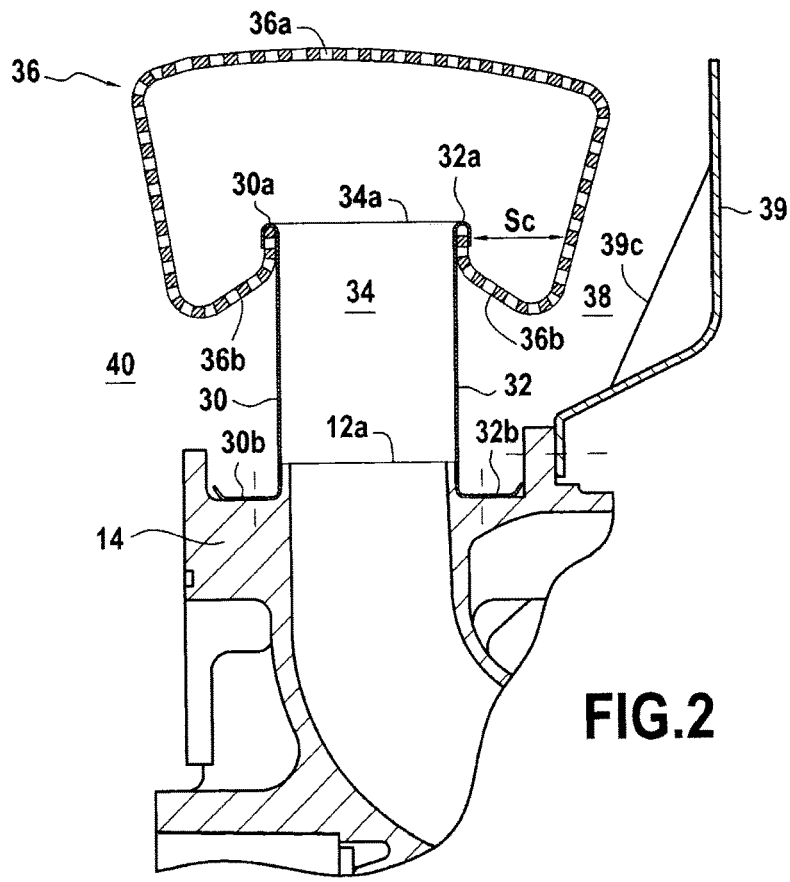
FIG. 2 is a fragmentary section view of an air intake of the invention.

In order to make the invention more concrete, an example air intake of the invention is described in detail below with reference to the accompanying drawings. It should be recalled that the invention is not limited to this example.

FIG. 1 is a diagram showing a gas turbine helicopter engine having a compressor stage 10 (e.g. a centrifugal compressor) receiving outside air via an annular air feed passage 12. At its upstream end, the passage 12 opens via an annular outer opening 12*a* that is defined by a metal casing 14 of the engine. The casing 14 also defines the walls of the passage 12. An annular combustion chamber 16, e.g. a reverse-flow combustion chamber, is provided with injectors (not shown) that are fed with fuel and with a stream of primary air coming from the compressor 10. The combustion gas from the chamber 16 enters into a turbine 18 driving the compressor 10 and connected thereto by a shaft 20, and also into a power turbine 22 (e.g. having a single stage) that is connected by a shaft 23 to gearing that delivers mechanical power to an outlet shaft 24, the shafts 20 and 23 being coaxial.

As shown in FIG. 2, two lips 30 and 32 (not shown in FIG. 1) define an air intake 34 for the passage 12. The lips 30 and 32 are formed by two respective thin annular metal sheets that connect at an inner end to the upstream end of the passage 12 on either side of the opening 12*a* and all along it. In this example, the metal sheets forming the lips 30 and 32 are made of a weldable metal, e.g. stainless steel, and they possess thickness of about 0.6 mm. At their opposite ends, or outer ends, the lips 30 and 32 present respective rims 30*a* and 32*a* that are outwardly curved in U-shapes so as to form U-shaped spaces 70. At their inner ends, the lips 30 and 32 may present tabs or collars 30*b* and 32*b* that are folded back at substantially 90° to enable them to be fastened to the casing 14.

The end 34*a* of the air intake 34 as defined by the rims 30*a* and 32*a* is covered by an anti-icing grid 36 of metal that is formable and strong, e.g. stainless steel, and that has rims curved towards the lips 30 and 32, so that the ends of these rims engage in the U-shaped spaces 70 of the rims 30*a* and 32*a*. The purpose of the grid 36 is to avoid ice forming inside the air intake 34 and the feed passage 12, with ice possibly forming on the external surface 36*a* of the grid 36. An annular bypass channel 38 is then provided to feed the passage 12 with sufficient air in spite of the external surface 36*a* of the grid 36 icing. The channel 38 is defined on one side by an annular wall angled guide 39 or plenum that is provided with stiffener ribs 39*a* and that is secured to the casing 14. The wall 39 is situated facing one of the lips of the air intake, e.g. the lip 32, that defines the other side of the channel 38. An analogous second bypass channel 40 is also provided beside the other lip 30 (its plenum is nevertheless not shown in order to avoid overcrowding the drawings). The curved rims of the anti-icing grid 36 define an internal bypass surface 36*b* on either side of the air intake 34, facing towards the casing 14, and thus opening out into the bypass channel 38 or 40, thereby enabling a stream of bypass air to be admitted when the external surface 36*a* of the grid 36 is iced. The bypass section Sc defined transversely between a lip 30, 32 and the anti-icing grid 36 determines the maximum flow rate for this bypass airstream.

Figure 3:
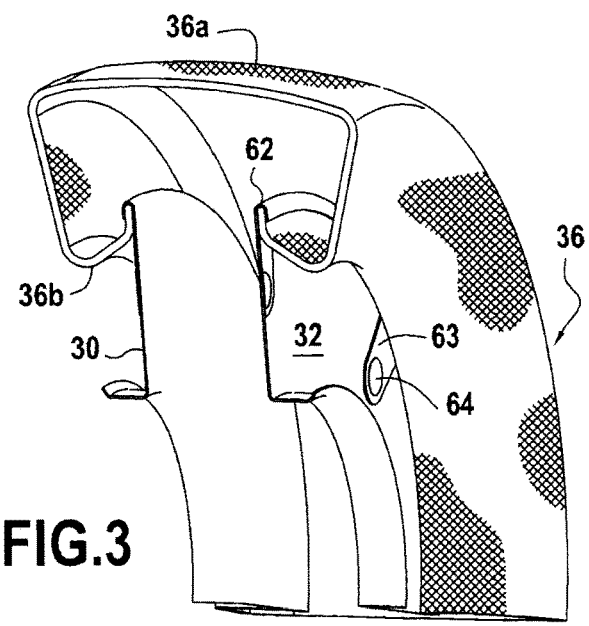
FIG. 3 is a fragmentary perspective view of the FIG. 2 air intake.

In FIG. 3 it can be seen that each lip 30, 32 may be made integrally over a large angular sector, typically occupying more than 90°. In this embodiment, the air intake 34 has two upstream lips 30 each occupying 180°, which lips touch each other so as to form the air intake 34 over 360°; in analogous manner, the air intake 34 likewise has two downstream lips 32 each extending over 180°. Incidentally, it should be observed that the lips 30 and 32 in this embodiment possess a profile of substantially rectangular section between their rims 30*a*, 32*a* and their tabs or collars 30*b*, 32*b*. Nevertheless, in other embodiments, this profile could be curved for one and/or the other of the lips 30, 32.

Figure 4:
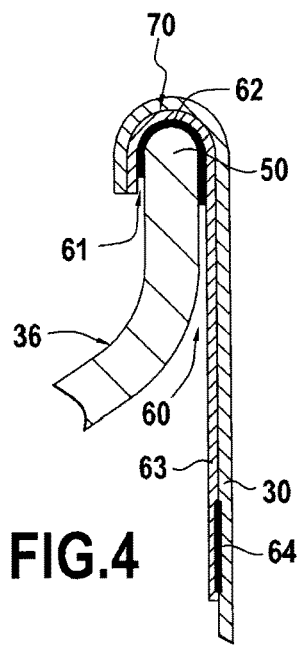
FIG. 4 is a diagrammatic view on a larger scale showing the FIG. 2 air intake and showing how the anti-icing grid is fastened to the lips of the air intake.

FIGS. 3 and 4 make it easier to visualize how the grid 36 is assembled on the lips 30, 32. As can be seen, the lateral end edges 50 of the grid 36 are curved towards the U-shaped space 70 of each of the lips 30, 32; a margin 60 is mounted along each of these edges 50 in order to serve as a fastening interface between the grid 36 and the lips 30, 32.

This margin 60 is in the form of a channel-section member that is made out of the same metal as the lip 30 or 32, extending circumferentially all around the edge 50 of the grid 36 and thus forming a groove 61 in which the lateral end edge 50 of the grid 36 is received: it is fastened thereto by brazing 62.

At regular intervals, the margin 60 also presents fastener tabs 63 that extend radially in line with the inner edge of the groove 61 towards the casing 14. In this way, when the edge 50 of the grid 36 is fastened in the groove 61 of the margin 60 and the margin 60 is received in the U-shaped space 70 of the lip 30, 32, the fastener tabs 63 extend along the outer wall of the lip 30, 32. The fastener tabs 63 are then fastened against the wall of the lip 30, 32 by spot welds 64. The fastener tabs 63 are of sufficient length to descend along the lips 30, 32 to a level that is lower than the level of the internal bypass surface 36b of the anti-icing grid 36 so as to allow tooling to pass when assembling the grid 36 on the lips 30, 32.

By using thin metal sheets, the lips 30, 32 are themselves very compact and it is possible for the grid 36 to be assembled in very compact manner on the lips 30, 32. For given overall size, it is thus possible to provide a large bypass section Sc.

FIG. 5B is a diagram showing the increase made possible by such an air intake compared with a conventional air intake of the prior art. In this figure, an air intake of the invention is drawn diagrammatically in continuous lines while an air intake of the prior art is drawn in dashed lines.

In the prior art air intake, the lips 90 that are machined in the solid material or that are made of composite material are thicker. In addition, the material is difficult to form so that the U-shaped space 91 formed by the rim of the lips 90 in which the lateral end edge 93 of the grid 92 is received presents a radius of curvature R' that is large, typically lying in the range about 5 mm to about 10 mm. Thus, in the prior art air intake, the bypass section Sc' between the lip 90 and the grid 92 is smaller.

In contrast, in the air intake of the invention, the lips 30, 32 are finer and form a U-shaped shape 70 presenting a radius of curvature R that is much smaller because of the good forming properties of the metal sheets: it is thus possible to obtain a radius of curvature R of about 2 mm or even less. Under such circumstances, the lateral end edge 50 of the grid 36 can be mounted on the lips 30, 32 much closer to the walls of the lips 30, 32, i.e. much closer to the midplane of the air intake. Thus, in the air intake of the invention, the bypass section Sc between the lips 30, 32 and the grid 36 is greater than in the prior art air intake.

The embodiments described in the present description are given by way of non-limiting illustration, and in the light of this description a person skilled in the art can easily modify these embodiments or can envisage others while remaining within the scope of the invention.

In particular, in the above detailed description, the air intake lips extend along the annular opening 12a of the air feed passage around the entire periphery of the engine: nevertheless, the invention is also applicable when the outer opening of the air feed passage extends over a fraction only of the periphery of the engine. Likewise, the invention is also applicable when the air feed passage has an outer opening that is axial and not radial. In addition, the description above uses the example of a helicopter, but the invention can naturally be transposed to any other gas turbine having an air intake provided with a grid having a bypass device.

Furthermore, the various characteristics of these embodiments may be used singly or they may be combined with one another. When they are combined, the characteristics may be combined as described above or in other ways, the invention not being limited to the specific combinations described in the present description. In particular, unless specified to the contrary, a characteristic described with reference to any one particular embodiment may be applied in analogous manner to any other embodiment.

The invention claimed is:

1. An air intake for a gas turbine helicopter engine including a compressor and a passage for feeding the compressor with air, which passage opens out at an upstream end thereof via the air intake, the air intake comprising:
   air intake lips; and
   an anti-icing grid mounted on outer ends of the air intake lips, being interposed in an air flow penetrating into the air intake,
   wherein at least one air intake lip is formed by a thin metal sheet,
   wherein an outer end of the at least one air intake lip has a U-shaped curve, and
   wherein a margin of the anti-icing grid is engaged in a U-shaped spaces defined by the U-shaped curve, the margin of the anti-icing grid presenting a groove in which a lateral end edge of the anti-icing grid is received, and the margin of the anti-icing grid being sandwiched between the lateral end edge of the anti-icing grid and the U-shaped curve of the outer end of the at least one air intake lip, and
   wherein the margin of the anti-icing grid includes a fastener tab that extends radially inward in line with an inner edge of the groove, the fastener tab being fastened to an outer wall of the at least one air intake lip, and the fastener tab extending along the at least one air intake lip to a level lower than a level of an internal bypass surface of the anti-icing grid.

2. An air intake according to claim 1, wherein the thin metal sheet forming the at least one air intake lip possesses thickness of less than 1.5 mm.

3. An air intake according to claim 2, wherein the thickness of the at least one intake lip is less than 0.8 mm.

4. An air intake according to claim 1, wherein the margin of the anti-icing grid includes a continuous fastener bead fastened to the at least one air intake lip.

5. An air intake according to claim 1, wherein the margin of the anti-icing grid is fastened to the at least one air intake lip by welds.

6. An air intake according to claim 1, wherein fastening of the anti-icing grid to the at least one air intake lip is devoid of adhesive bonding.

7. An air intake according to claim 1, wherein the margin of the anti-icing grid is a part that is separate from a body of the anti-icing grid, the margin of the anti-icing grid being fastened to the body of the anti-icing grid.

8. An air intake according to claim 7, wherein the margin of the anti-icing grid is fastened to the body of the anti-icing grid by brazing.

9. A gas turbine helicopter engine comprising an air intake according to claim 1.

10. An air intake according to claim 1, wherein a thickness of the at least one air intake lip is constant between the outer end of the at least one air intake lip and an inner end of the at least one air intake lip.

11. An air intake according to claim 10, wherein the inner end of the at least one air intake lip presents a collar which is fastened to a casing of the gas turbine helicopter engine.

12. An air intake according to claim 1, wherein the fastener tab is fastened to the outer wall of the at least one air intake lip by welding.

* * * * *